(12) United States Patent
Heo et al.

(10) Patent No.: US 12,544,963 B1
(45) Date of Patent: Feb. 10, 2026

(54) MULTI-CONTROL SYSTEM OF MOLD COOLING STRUCTURE

(71) Applicants: Man Woo Heo, Daegu (KR); Jin Guk Lee, Daegu (KR)

(72) Inventors: Man Woo Heo, Daegu (KR); Jin Guk Lee, Daegu (KR)

(73) Assignee: Man Woo Heo, Daegu (KR)

( * ) Notice: Subject to any disclaimer, the term of this patent is extended or adjusted under 35 U.S.C. 154(b) by 0 days.

(21) Appl. No.: 19/320,543

(22) Filed: Sep. 5, 2025

(51) Int. Cl.
*B29C 45/73* (2006.01)
*B29C 45/78* (2006.01)

(52) U.S. Cl.
CPC ...... *B29C 45/7306* (2013.01); *B29C 45/7312* (2013.01); *B29C 45/78* (2013.01); *B29C 2045/7343* (2013.01); *B29C 2945/76006* (2013.01); *B29C 2945/76304* (2013.01); *B29C 2945/76334* (2013.01); *B29C 2945/76545* (2013.01); *B29C 2945/76782* (2013.01)

(58) Field of Classification Search
CPC . B29C 45/7306; B29C 45/7312; B29C 45/78; B29C 2045/7343; B29C 2945/76006; B29C 2945/76304; B29C 2945/76334; B29C 2945/76545; B29C 2945/76782
See application file for complete search history.

(56) References Cited

U.S. PATENT DOCUMENTS

| | | | | |
|---|---|---|---|---|
| 4,680,001 A | * | 7/1987 | Waters | B29C 45/7306 425/29 |
| 5,523,640 A | * | 6/1996 | Sparer | H02K 11/33 361/699 |
| 6,312,628 B1 | * | 11/2001 | Wieder | B29C 45/7306 264/328.16 |
| 6,471,503 B1 | * | 10/2002 | Priest | F16K 3/085 137/625.41 |
| 9,610,709 B2 | * | 4/2017 | Halford | B29C 31/00 |
| 2005/0179157 A1 | * | 8/2005 | Muranaka | B29C 35/007 264/40.6 |
| 2010/0003359 A1 | * | 1/2010 | Shimoda | B29C 45/7306 425/144 |
| 2010/0044900 A1 | * | 2/2010 | Shikase | B29C 45/78 264/40.6 |

(Continued)

*Primary Examiner* — Nahida Sultana
(74) *Attorney, Agent, or Firm* — PARK LAW FIRM

(57) ABSTRACT

This invention presents a multi-control system for mold cooling that prevents injection molding product deformation. The system supplies various temperature water through injection mold flow paths to control different mold portion temperatures.

Cold and hot water tanks (41, 42) store temperature-adjusted water. Water supply pumps (45) deliver water to conversion distributor A, where opening and closing valves (26) regulate flow to supply branch pipes (24), then first supply pipes (21), through cooling cores (10) flow paths (11). This heats or cools cooling cores (10) and upper and lower molds (1, 2) at different temperatures before returning via first return pipes (22) and return branch pipes (25) to temperature adjustment units (40).

Opening and closing valves (26) control water temperature during injection cycles, adjusting pressure and flow rate for each cooling core (10), enabling rapid temperature control and improved productivity while preventing product deformation.

5 Claims, 10 Drawing Sheets

(56) References Cited

U.S. PATENT DOCUMENTS

| | | | |
|---|---|---|---|
| 2011/0045120 A1* | 2/2011 | Higashi | B33Y 30/00 425/552 |
| 2012/0219662 A1* | 8/2012 | Lausenhammer | B29C 45/7312 425/547 |
| 2017/0001355 A1* | 1/2017 | Lindner | B29C 45/2626 |
| 2018/0133943 A1* | 5/2018 | Aiba | B29C 45/7306 |
| 2023/0182361 A1* | 6/2023 | Lamarre | B29C 45/26 425/552 |

* cited by examiner

MULTI-CONTROL SYSTEM OF MOLD COOLING STRUCTURE

1. FIELD OF THE INVENTION

The present invention relates to a multi-control system of a mold cooling structure that is a new structure to prevent an injection molding product from being deformed while being cooled by freely supplying water at various temperatures to an injection mold through flow paths formed in the injection mold so as to freely adjust temperatures of portions of the injection mold.

2. DISCUSSION OF RELATED ART

In general, an injection mold, which is used when a synthetic resin product is injected, includes upper and lower molds of which adjacent surfaces are provided with cavities formed therein and is formed to manufacture the injection molding product having a desired shape by injecting the synthetic resin in the cavities while the upper and lower molds are engaged with each other.

However, since the synthetic resin injected into the injection mold is heated to a high temperature and has a large amount of latent heat, when the high temperature synthetic resin is injected into the injection mold, the injection mold is heated, and when the injection molding product is repeatedly manufactured using the mold heated as described above, the manufactured injection molding product is extracted in a state in which the manufactured injection molding product is not sufficiently cooled. Therefore, a problem that the injection molding product, which is not sufficiently cooled as described above, is deformed while being cooled at room temperature occurs.

Accordingly, a method of forming flow paths through which cooling water passes in upper and lower molds and extracting an injection molding product after the injection molding product is sufficiently cooled by supplying the cooling water to the flow paths to cool the upper and lower molds has recently been developed and used.

However, since low temperature cooling water is conventionally simply supplied to the flow paths to uniformly cool the entire mold, there is a problem that it is difficult to accurately adjust temperatures of portions of the mold.

That is, although it is preferable to precisely adjust the temperatures of the portions of the mold according to a shape of an injection molding product in order to prevent deformation of the injection molding product, since cooling water at the same temperature is conventionally supplied to the flow paths to decrease the temperature of the entire mold, a problem that it is difficult to effectively prevent the injection molding product formed in the cavities of the mold from being deformed while being cooled after being extracted therefrom occurs.

Accordingly, a new method of solving these problems is required.

RELATED ART

[Patent Document]
(Patent Document 1) Korean Registered Patent No. 10-1210224.

SUMMARY OF THE INVENTION

The present invention is to solve these problems and is directed to providing a multi-control system of a mold cooling structure that is a new structure to prevent an injection molding product from being deformed while being cooled by freely supplying water at various temperatures to an injection mold through flow paths formed in the injection mold so as to freely adjust temperatures of portions of the injection mold.

The present invention for achieving the above-described object provides a multi-control system of a mold cooling structure including upper and lower molds (1, 2) of which adjacent surfaces are provided with cavities (3) formed therein, wherein one or a plurality of flow paths (11) and one or a plurality of connection passages (5) connected to the one or the plurality of flow paths (11) are formed in the upper mold (1) or the lower mold (2), and the multi-control system further includes a conversion distributor (A) connected to the one or the plurality of connection passages (5) through one or a plurality of first supply pipes (21) and one or a plurality of first return pipes (22), a multi-temperature controller (B) connected to the conversion distributor (A) through second supply pipes (31) and second return pipes (32), and a control unit (50) which controls operation of the conversion distributor (A) and the multi-temperature controller (B), water of which a temperature is variously adjusted is supplied to the conversion distributor (A) using the multi-temperature controller (B), and the water supplied by the multi-temperature controller (B) is supplied to flow paths (11) different from each other using the conversion distributor (A).

According to another feature of the present invention, the conversion distributor (A) may include a distribution case (23), a plurality of supply branch pipes (24) connecting the first supply pipes (21) and the second supply pipes (31), a plurality of return branch pipes (25) connecting the first return pipes and the second return pipes (32), and opening and closing valves (26) provided in the supply branch pipes (24) and the return branch pipes (25), wherein a plurality of supply branch parts (24a) connected to the first supply pipes (21) may be formed in front end portions of the supply branch pipes (24), rear end portions of the supply branch pipes (24) may each be connected to any one of the second supply pipes (31), a plurality of return branch parts (25a) connected to the first return pipes (22) may be formed in front end portions of the return branch pipes (25), rear end portions of the return branch pipes (25) may each be connected to any one of the second return pipes (32), and the opening and closing valves (26) may be provided in the supply branch parts (24a) and the return branch parts (25a) and may control flows of the water passing through the supply branch parts (24a) and the return branch part (25a).

According to still another feature of the present invention, the multi-temperature controller (B) may include a temperature adjustment case (33) and a plurality of temperature adjustment units (40) provided in the temperature adjustment case (33) and connected to the second supply pipes (31) and the second return pipes (32), wherein the second supply pipes (31) and the second return pipes (32) are connected to the rear end portions of the supply branch pipes (24) and the return branch pipe (25), the temperature adjustment units (40) may include cold and hot water tanks (41, 42) in which the water is stored, third supply pipes (43) connecting the cold and hot water tanks (41, 42) to the second supply pipes (31) in parallel, third return pipes (44) connecting the cold and hot water tanks (41, 42) to the second return pipes (32) in parallel, water supply pumps (45) provided in the third supply pipes (43), and temperature adjustment parts (46) which are connected to the cold and hot water tanks (41, 42) and adjust the temperature of the water stored in the cold and hot water tanks (41, 42).

According to yet another feature of the present invention, a space portion (4) may be formed in the upper mold (1) or the lower mold (2), a plurality of cooling cores (10) of which circumferential surfaces are provided with the flow paths (11) formed therein may be provided in the space portion (4), and the connection passages (5) of which one ends are connected to the cooling cores (10) and the other ends extend outward from the upper and lower molds (1, 2) may be formed in the upper mold (1) or the lower mold (2).

According to yet another feature of the present invention, each of the cooling cores (10) may be formed in a quadrangular block shape extending in a vertical direction, and each of the flow paths (11) may include vertical grooves (11a) formed in both surfaces of the cooling core (10) to extend in the vertical direction and a connection groove (11b) formed in an upper surface or a lower surface of the cooling core (10) to connect the vertical grooves (11a).

According to yet another feature of the present invention, directions of the connection grooves (11b) of the cooling cores (10), which are provided in the space portion (4) and of which the side surfaces are in close contact with each other, may intersect each other.

According to yet another feature of the present invention, the upper mold (1) may include an upper mold body (1a) of which a lower surface is provided with the cavity (3) formed therein and an upper surface is provided with the space portion (4) concavely formed therein and an upper cover (1b) coupled to the upper surface of the upper mold body (1a) to seal the space portion (4), the lower mold (2) may include a lower mold body (2a) of which an upper surface is provided with the cavity (3) formed therein and a lower surface is provided with the space portion (4) concavely formed therein and a lower cover (2b) coupled to the lower surface of the lower mold body (2a) to seal the space portion (4), and the connection passages (5) may be formed in the upper cover (1b) and the lower cover (2b) such that one sides of the connection passages (5) are connected to the vertical groove (11a) and the other ends of the connection passages (5) are formed to extend outward from the upper cover (1b) and the lower cover (2b).

According to yet another feature of the present invention, the multi-control system may further include a pressing unit (51) which is connected to the third supply pipes (43) and the third return pipes (44) of the multi-temperature controller (B) and supplies high pressure water to the third supply pipes (43) and the third return pipes (44), pressure sensors (52) which are provided in the third supply pipes (43) and the third return pipes (44) and measure internal pressures of the third supply pipes (43) and the third return pipes (44), and an alarm unit (53) connected to the control unit (50), wherein the control unit (50) may drive the pressing unit (51) to supply the high pressure water to the third supply pipes (43) and the third return pipes (44) and receive signals of the pressure sensors (52), and when the pressures of the third supply pipes (43) and the third return pipes (44) do not increase to a preset reference pressure or more, the control unit (50) may determine that a connection state of the first and second supply pipes (21, 31) or the first and second return pipes (22, 32) is unstable and drive the alarm unit (53) to notify a worker of the unstable connection state.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, the present invention will be described in detail with reference the accompanying drawings.

FIGS. 1 to 9 are views illustrating a multi-control system of a mold cooling structure according to the present invention, in which a lens having a central portion that is convex upward and formed of a synthetic resin material is manufactured.

Here, like the conventional case, the multi-control system of a mold cooling structure according to the present invention includes upper and lower molds 1 and 2 of which adjacent surfaces are provided with cavities 3 formed therein.

In addition, according to the present invention, in the upper mold 1 or the lower mold 2, a plurality of flow paths 11 and a plurality of connection passages 5 connected to the flow paths 11 are formed, and a conversion distributor A connected to the connection passages 5 through a plurality of first supply pipes 21 and a plurality of first return pipes 22, a multi-temperature controller B connected to the conversion distributor A through second supply pipes 31 and second return pipes 32, and a control unit 50 which controls operation of the conversion distributor A and the multi-temperature controller B are further provided to supply water adjusted to be various temperatures to the conversion distributor A using the multi-temperature controller B and to supply the water supplied by the multi-temperature controller B to the flow paths 11 different from each other using the conversion distributor A.

To this end, as illustrated in FIGS. 2 to 6, in the upper and lower molds 1 and 2, space portions 4 are formed, and a plurality of cooling cores 10 are formed in each of the space portions 4. In addition, in the upper mold 1 or the lower mold 2, the connection passages 5 of which one ends are connected to the cooling cores 10 and the other ends extend outward from the upper or lower mold 1 or 2 are formed.

Figure 2:
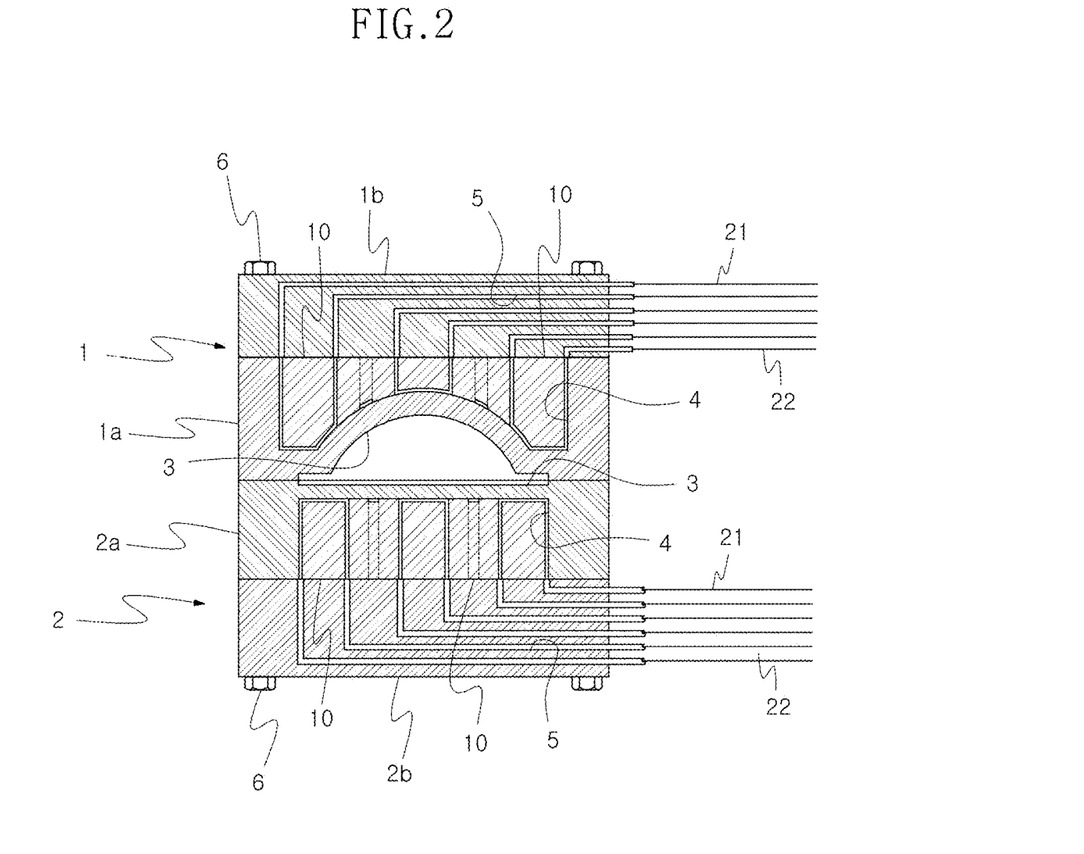
FIG. 2 is a front cross-sectional view illustrating upper and lower molds of the multi-control system of a mold cooling structure according to the present invention.
Figure 3:
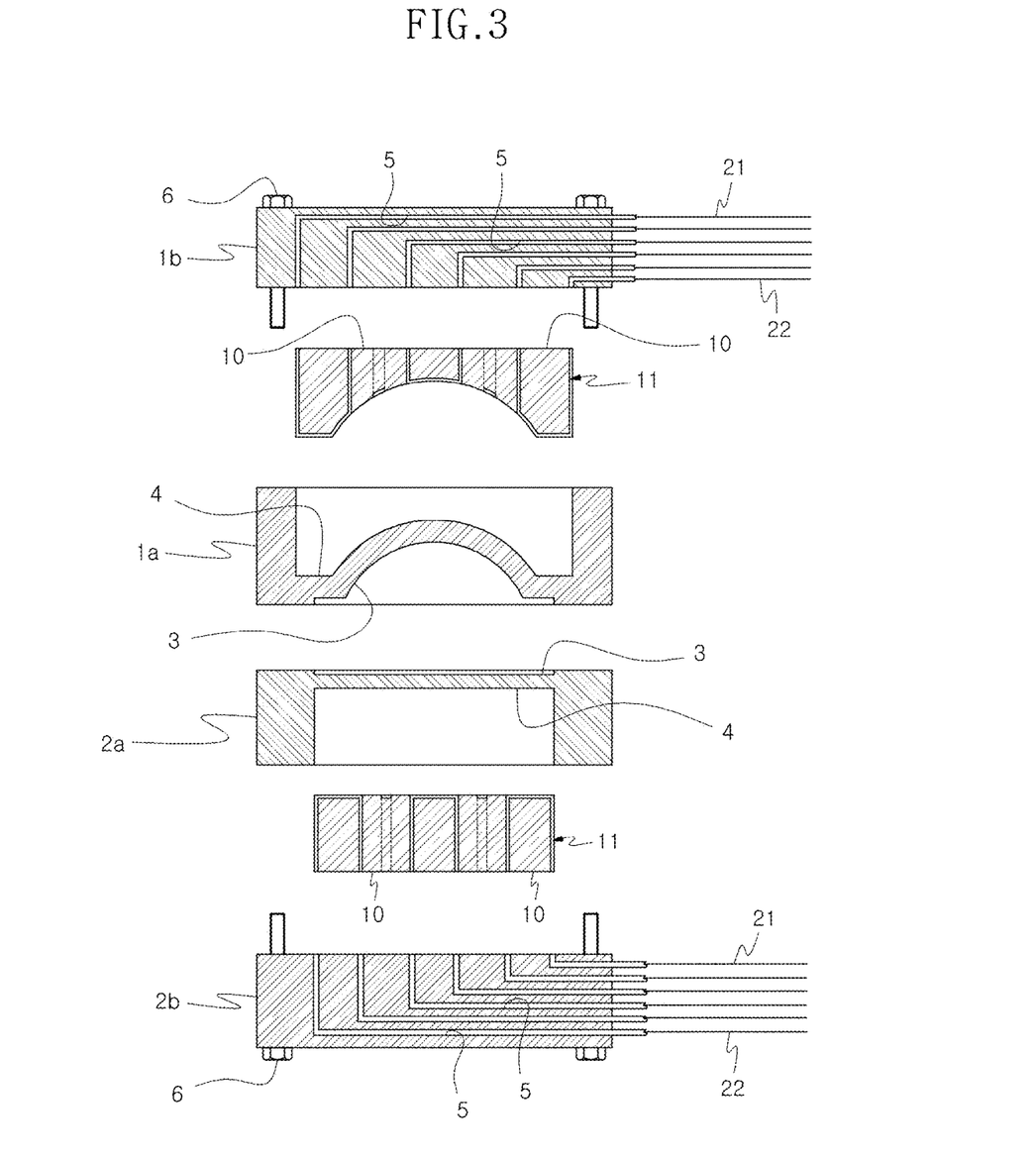
FIG. 3 is an exploded front cross-sectional view illustrating the upper and lower molds of the multi-control system of a mold cooling structure according to the present invention.
Figure 4:
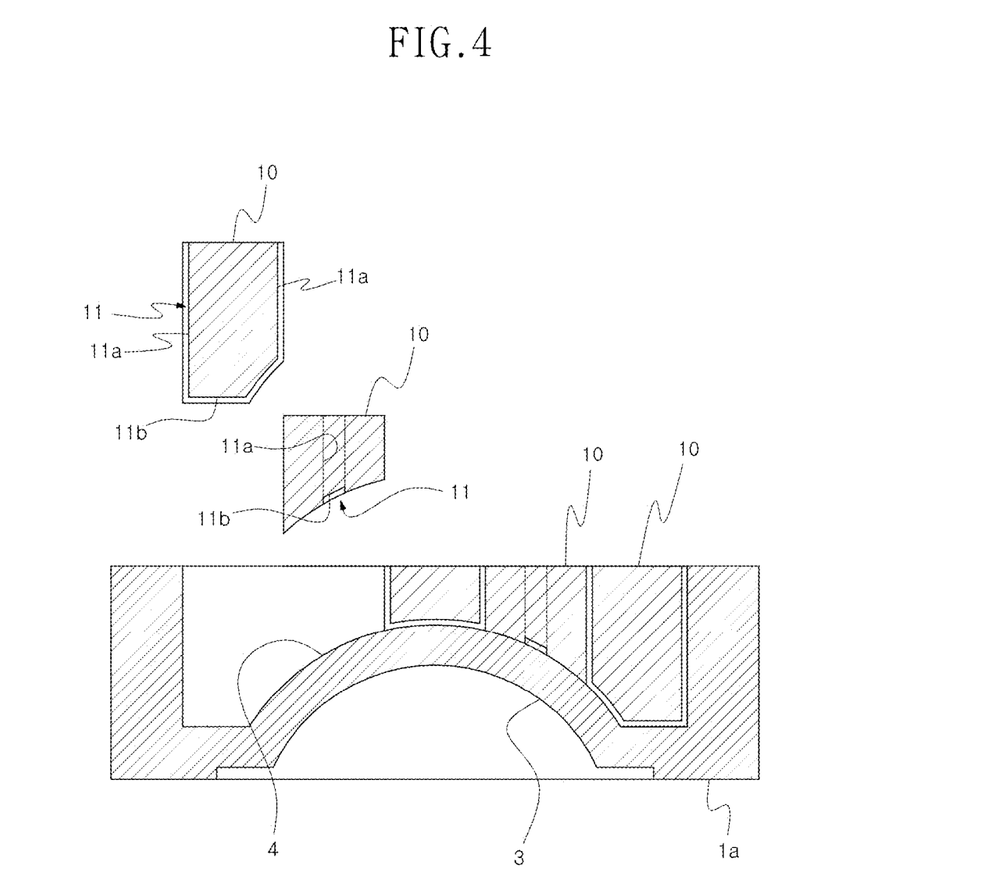
FIG. 4 is an exploded front cross-sectional view illustrating a cooling core of the upper mold of the multi-control system of a mold cooling structure according to the present invention.

Specifically, the upper mold 1 includes an upper mold body 1a, of which a lower surface is provided with the cavity 3 formed therein and an upper surface is provided with the space portion 4 concavely formed therein, and an upper cover 1b coupled to the upper surface of the upper mold body 1a to seal the space portion 4.

In this case, the cavity 3 of the upper mold 1 is formed such that a central portion of the cavity 3 is concave upward.

In addition, the lower mold 2 includes a lower mold body 2a, of which an upper surface is provided with the cavity 3 formed therein and a lower surface is provided with the space portion 4 concavely formed therein, and a lower cover 2b coupled to the lower surface of the lower mold body 2a to seal the space portion 4.

In this case, the upper cover 1b and the lower cover 2b are screw-coupled to the upper mold body 1a and the lower mold body 2a by fixing bolts 6.

Figure 6:
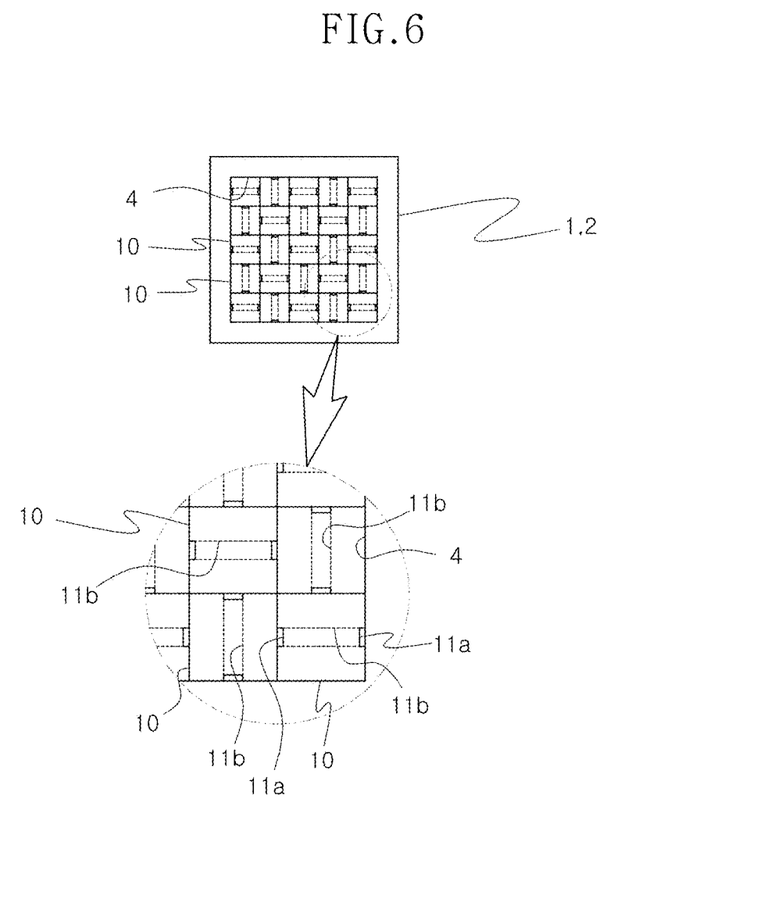
FIG. 6 is a plan view illustrating the upper mold of the multi-control system of a mold cooling structure according to the present invention.

As illustrated in FIGS. 6, the space portions 4 are formed in quadrangular shapes in the upper mold body 1a and the lower mold body 2a.

In addition, the cooling cores 10 are formed in quadrangular block shapes extending in a vertical direction, and the plurality of cooling cores 10 are installed to be inserted into the space portions 4 such that side surfaces of the plurality of cooling cores 10 are in close contact with each other.

Figure 5:
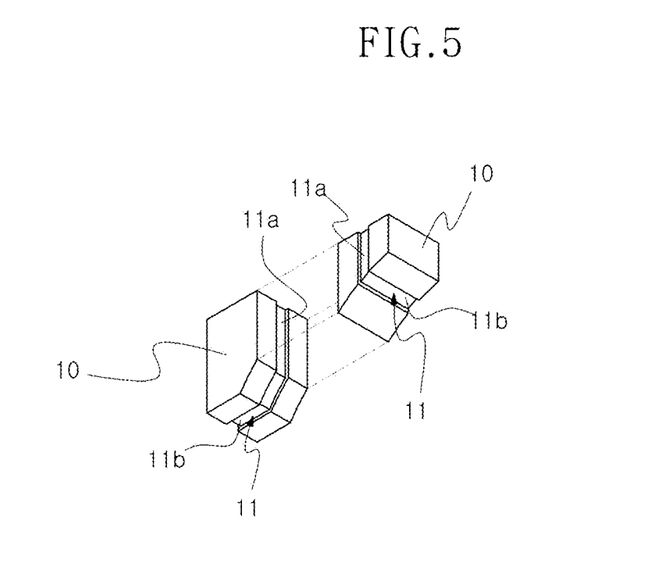
FIG. 5 is a perspective view illustrating the cooling core of the multi-control system of a mold cooling structure according to the present invention.

In addition, the flow paths 11 through which the water passes are formed in circumferential surfaces of the cooling cores 10.

As illustrated in FIGS. 3 to 5, the flow paths 11 include vertical grooves 11a concavely formed in both surfaces of each of the cooling cores 10 to extend in the vertical direction and connection grooves 11b concavely formed in upper surfaces or lower surfaces of the cooling cores 10 to connect the vertical grooves 11a such that the water supplied through the vertical grooves 11a at one side is discharged to the outside through the connection grooves 11b and the vertical grooves 11a at the other side.

To this end, as illustrated in FIG. 6, directions of the connection grooves 11b of the cooling cores 10, which are provided in the space portion 4 and of which the side surfaces are in close contact with each other, intersect each other.

That is, when the connection groove 11b of the cooling core 10 at one side is disposed in a left-right direction, the connection groove 11b of the cooling core 10 in close contact with one of four surfaces of the corresponding cooling core 10 is disposed in a front-rear direction.

When the cooling cores 10 are disposed in the space portion 4 as described above, outer surfaces of the vertical grooves 11a formed in the cooling cores 10 are sealed by the circumferential surfaces of the other cooling cores 10 disposed on the side surfaces of the cooling cores 10, and the connection grooves 11b are in close contact with an inner bottom surface of the space portion 4 so that the vertical grooves 11a and the connection grooves 11b form the closed flow paths 11.

In this case, in the cooling cores 10 disposed in the upper mold 1, the connection grooves 11b are disposed downward, and in the cooling core 10 disposed in the lower mold 2, the connection grooves 11b are disposed upward.

In addition, in the upper cover 1b and the lower cover 2b provided in the upper and lower molds 1 and 2, one ends of the connection passages 5 are connected to the flow paths 11 of the cooling cores 10, and the other ends thereof are formed to extend outward from the upper cover 1b and the lower cover 2b.

Accordingly, when the water at different temperatures is supplied to the connection passages 5 using the conversion distributor A and the multi-temperature controller B, the supplied water flows through the connection passages 5 and the flow paths 11 formed in the cooling cores 10 to cool or heat the cooling cores 10, and thus temperatures of portions of the upper and lower molds 1 and 2 are adjusted.

In this case, the number of the cooling cores 10 may be variously changed according to sizes or shapes of the upper and lower molds 1 and 2.

Figure 7:
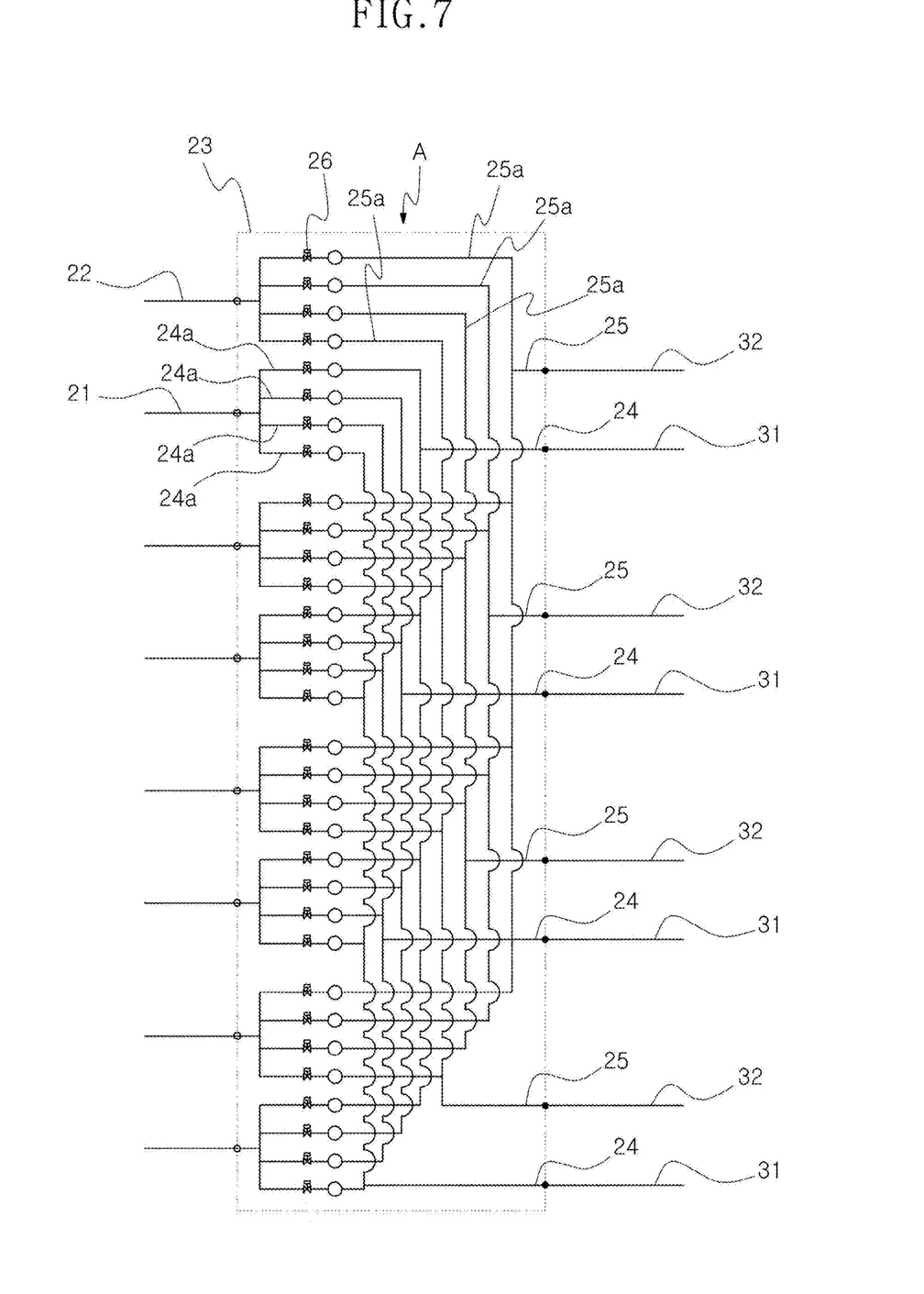
FIG. 7 is a block diagram illustrating a conversion distributor of the multi-control system of a mold cooling structure according to the present invention.

As illustrated in FIG. 7, the conversion distributor A includes a distribution case 23, a plurality of supply branch pipes 24 connecting the first supply pipes 21 and the second supply pipes 31, a plurality of return branch pipes 25 connecting the first return pipes and the second return pipes 32, and opening and closing valves 26 provided in the supply branch pipes 24 and the return branch pipes 25.

A plurality of supply branch parts 24a connected to each of the first supply pipes 21 are formed in front end portions of the supply branch pipes 24, and rear end portions thereof are each formed to be connected to any one of the second supply pipes 31.

A plurality of return branch parts 25a connected to each of the first return pipes 22 are formed in front end portions of the return branch pipes 25, and rear end portions thereof are each formed to be connected to any one of the second return pipes 32.

In this case, the number of the supply branch parts 24a of each of the supply branch pipes 24 and the number of the return branch parts 25a of each of the return branch pipes 25 are the same as the number of the cooling cores 10.

Figure 1:
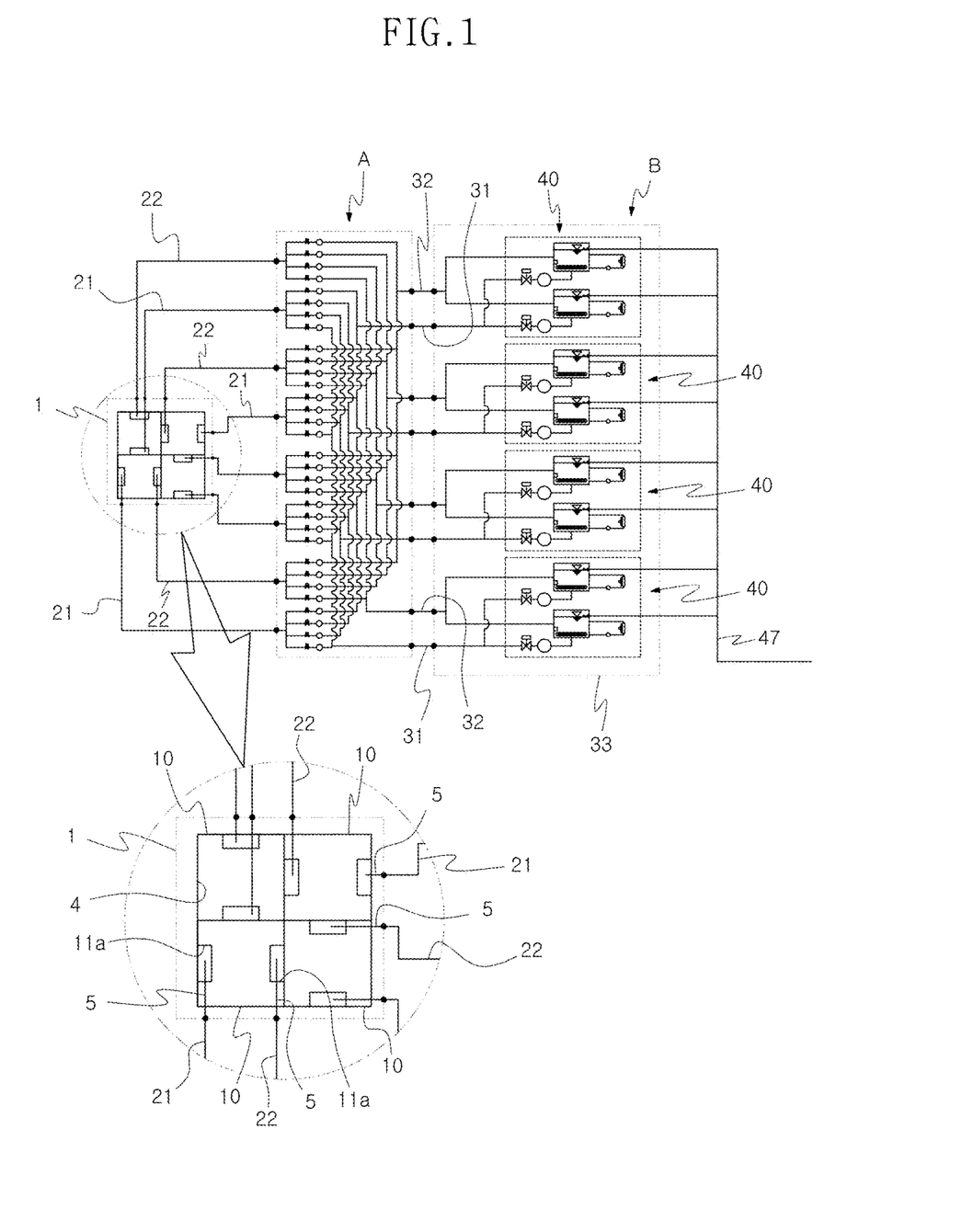
FIG. 1 is a block diagram illustrating a multi-control system of a mold cooling structure according to the present invention.

For example, in the case of FIG. 1, four cooling cores 10 are formed in the upper mold 1, and four supply branch parts 24a and four return branch parts 25a are formed so that the numbers of the supply branch parts 24a and the return branch parts 25a are the same as the number of the cooling cores 10.

In addition, the supply branch parts 24a and the return branch parts 25a provided in the supply branch pipes 24 and the return branch pipes 25, respectively, are connected to the first supply pipes 21 and the first return pipes 22 to be parallel and connected to both ends of the flow paths 11 formed in four cooling cores 10 provided in the upper mold 1.

Solenoid valves each provided on one of the supply branch parts 24a and the return branch parts 25a are used as the opening and closing valves 26, which are formed such that operation of the opening and closing valves 26 is controlled by the control unit 50 to control flows of water flowing through the supply branch parts 24a and the return branch parts 25a.

Accordingly, the opening and closing valves 26 may be controlled to supply the water supplied through the supply branch pipe 24 at the uppermost side to an arbitrary first supply pipe 21 of four first supply pipes 21 through one of the supply branch parts 24a and to return the water supplied to one of the flow paths 11 through the first supply pipe 21 to an arbitrary return branch pipe 25.

Figure 8:
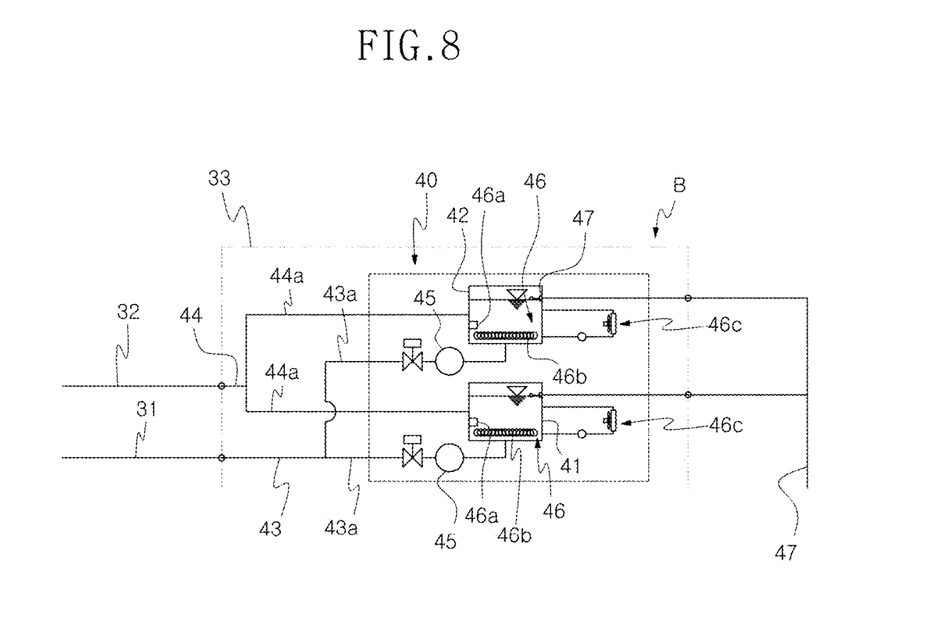
FIG. 8 is a block diagram illustrating a multi-temperature controller of the multi-control system of a mold cooling structure according to the present invention.

As illustrated in FIGS. 1 and 8, the multi-temperature controller B includes a temperature adjustment case 33 and a plurality of temperature adjustment units 40 provided in the temperature adjustment case 33 and connected to the second supply pipes 31 and the second return pipes 32.

The second supply pipes 31 and the second return pipes 32 are connected to the rear end portions of the supply branch pipes 24 and the return branch pipes 25.

The temperature adjustment units 40 include cold and hot water tanks 41 and 42 in which the water is stored, third supply pipes 43 connecting the cold and hot water tanks 41 and 42 to the second supply pipes 31 in parallel, third return pipes 44 connecting the cold and hot water tanks 41 and 42 to the second return pipes 32 in parallel, water supply pumps 45 provided in the third supply pipes 43, and temperature adjustment parts 46 connected to the cold and hot water tanks 41 and 42, adjust temperatures of the water stored in the cold and hot water tanks 41 and 42, and are connected to the conversion distributor A through the second supply pipes 31 and the second return pipes 32 to supply the temperature-adjusted water to the conversion distributor A, Front end portions of the third supply pipes 43 are connected to the second supply pipes 31, and rear end portions thereof are each branched off into two rear end portions to form branch parts 43a connected to the cold and hot water tanks 41 and 42.

Front end portions of the third return pipes 44 are connected to the second return pipes 32, and rear end portions thereof are each branched off into two rear end portions to form branch parts 44a connected to the cold and hot water tanks 41 and 42.

The water supply pumps 45 are provided on the branch parts 43a of the third supply pipes 43, and when the water supply pumps 45 operate, the water stored in the cold water tank 41 or the hot water tank 42 is supplied to the second supply pipes 31 through the third supply pipes 43.

The temperature adjustment parts 46 may include temperature sensors 46a provided in the cold and hot water tanks 41 and 42, heaters 46b provided in the cold and hot water tanks 41 and 42, and coolers 46c which are connected to the cold and hot water tanks 41 and 42, cool the water stored in the cold and hot water tanks 41 and 42 with air, and operate to heat or cool the water stored in the cold and hot water tanks 41 and 42 to various temperatures.

The control unit 50 receives signals of the temperature sensors 46a, measures temperatures of the water stored in the cold and hot water tanks 41 and 42, and controls the water supply pumps 45 and the temperature adjustment parts 46 to adjust temperatures of the water stored in the cold and hot water tanks 41 and 42 to input temperatures, that is, high temperatures or low temperatures.

Figure 9:
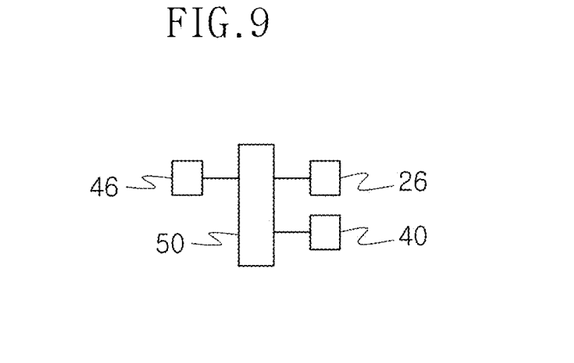
FIG. 9 is a block diagram illustrating the multi-control system of a mold cooling structure according to the present invention.

In addition, the control unit 50 controls the opening and closing valves 26 provided in the conversion distributor A to allow the water supplied by the temperature adjustment units 40 to pass through preset paths, to be supplied to the flow paths 11 of the cooling cores 10 provided in the upper and lower molds 1 and 2, then to pass through preset paths, and to return to the cold and hot water tanks 41 and 42 of the temperature adjustment units 40.

In this case, water supply pipes 47 for supplying the water are connected to the cold and hot water tanks 41 and 42, and water level adjustment valves 48 are provided in the water supply pipes 47 such that predetermined water levels of the cold and hot water tanks 41 and 42 are maintained.

In addition, temperatures of the water stored in the cold and hot water tanks 41 and 42 of the temperature adjustment units 40 are adjusted to be different from each other.

For example, temperatures of the water stored in the cold water tanks 41 provided in the temperature adjustment units 40 may be adjusted to be temperatures ranging from 0 to 120° C., and temperatures of the water stored in the hot water tanks 42 provided in the temperature adjustment units 40 may be adjusted to be temperatures ranging from 0 to 180° C. or more.

A method of manufacturing an injection molding product using the multi-control system of a mold cooling structure formed as described above will be described below.

First, the control unit 50 controls the temperature adjustment parts 46 to adjust temperatures of water stored in the cold and hot water tanks 41 and 42 provided in the temperature adjustment units 40.

In addition, the control unit 50 drives the water supply pumps 45 and simultaneously controls the opening and closing valves of the conversion distributor A to selectively supply the water at different temperatures to the cooling cores 10 so as to adjust temperatures of the cooling cores 10 to heat the portions of the upper mold 1 and the lower mold 2

In this case, among the cooling cores 10 provided in the upper mold 1 illustrated in FIGS. 2 to 4, a temperature of the cooling core 10 provided in a central portion, at which a level of the cavity 3 is high, may be adjusted to be a lowest temperature of 65° C., and a temperature of the cooling core 10 provided in a circumferential portion, at which a level of the cavity 3 is low, may be adjusted to be a highest temperature of 85° C.

In addition, a synthetic resin is injected into the cavities 3 formed in the upper mold 1 and the lower mold 2.

When the upper mold 1 and the lower mold 2 are heated, and then the synthetic resin is injected into the cavities 3, the synthetic resin may be smoothly injected into the cavities 3.

In addition, the portions of the upper mold 1 and the lower mold 2 are cooled to different temperatures by supplying the water at the different temperatures to the flow paths 11 of the cooling cores 10 using the multi-temperature controller B and the conversion distributor A.

For example, the cooling core 10 provided in the central portion may be adjusted to a temperature of 35° C., and the cooling core 10 provided in the circumferential portion may be adjusted to be a temperature of 65° C.

In this case, the control unit 50 may control the opening and closing valves 26 to supply the water with various pressures to the cooling cores 10 and to freely change the water to cold or hot water and supply the water to the cooling cores 10 as necessary.

In addition, when the opening and closing valves 26 are adjusted to supply the water, which is supplied to two supply branch pipes 24, to one first supply pipe 21, a pressure and a flow rate of the water supplied to the cooling core 10 through the corresponding first supply pipe 21 may increase to more rapidly heat or cool the cooling core 10 connected to the corresponding first supply pipe 21.

In addition, when temperatures of the upper mold 1 and the lower mold 2 are lowered as described above, the synthetic resin supplied to the cavities 3 is cooled to complete an injection molding product, and when the completed injection molding product is extracted, temperatures of the entire injection molding product may be uniform, and temperatures of portions of the completed injection molding product may become different from each other to prevent the injection molding product from being deformed.

In the multi-control system of a mold cooling structure provided as described above, in a state in which temperatures of the water stored in the cold and hot water tanks 41 and 42 are adjusted to be set temperatures, when the water supply pumps 45 are driven, the water stored in the cold and hot water tanks 41 and 42 is supplied to the conversion distributor A, and when the opening and closing valves 26 provided in the conversion distributor A are adjusted, the water supplied to the supply branch pipes 24 is supplied to the first supply pipes 21 and then passes through the flow paths 11 of the cooling cores 10 to heat or cool the cooling cores 10 and the portions of the upper and lower molds 1 and 2 at temperatures different from each other, and then returned to the cold and hot water tanks 41 and 42 of the temperature adjustment units 40 through the first return pipes 22 and the return branch pipes 25.

Accordingly, the temperatures of the cooling cores 10 and the portions of the upper and lower molds 1 and 2 can be freely adjusted.

Particularly, as necessary, the opening and closing valves 26 may be controlled even during an injection cycle to change the water supplied to the cores 10 to be high temperature or low temperature water so as to freely adjust an input time and pressure or flow rate of the water supplied to each of the cooling cores 10.

That is, when the opening and closing valves 26 are adjusted to supply the water, which is supplied to two supply branch pipes 24, to one first supply pipe 21, the pressure and the flow rate of the water supplied to the cooling core 10 through the corresponding first supply pipe 21 increase, and thus the cooling core 10 connected to the corresponding first supply pipe 21 can be more rapidly heated or cooled to more rapidly adjust the portions of the upper and lower molds 1 and 2.

Accordingly, since the injection molding product is extracted after the synthetic resin injected into the upper and lower molds 1 and 2 is sufficiently cooled, there are advantages that the injection molding product, which is not sufficiently cooled, can be prevented from being deformed while being cooled at room temperature to improve the quality of the product, and a speed of cooling the upper and lower molds 1 and 2 can be improved to reduce a time for cooling the upper and lower molds 1 and 2 to improve productivity.

Accordingly, since the injection molding product is extracted after the synthetic resin injected into the upper and lower molds 1 and 2 is sufficiently cooled, there are advantages that the injection molding product, which is not sufficiently cooled, can be prevented from being deformed while being cooled at room temperature to improve the quality of the quality of the product, and the speed of cooling the upper and lower molds 1 and 2 can be improved to reduce the time for cooling the upper and lower molds 1 and 2 to improve productivity.

In addition, the space portion 4 is formed in the upper mold 1 or the lower mold 2, the plurality of cooling cores 10 are formed in the space portion 4, and the connection passages 5 of which one ends are connected to the cooling cores 10 and the other ends extend outward from the upper and lower molds 1 and 2 are formed in the upper mold 1 or the lower mold 2, and thus there are advantages that it is easy to form the flow paths 11 in the upper and lower molds 1 and 2, and design and manufacture of the flow paths 11 are easier.

In addition, the cooling cores 10 are formed in the quadrangular block shapes extending in the vertical direction, the flow paths 11 are formed in the circumferential surfaces of the cooling cores 10, and the flow paths 11 include the vertical grooves 11a concavely formed in both surfaces of the cooling cores 10 to extend in the vertical direction and the connection grooves 11b concavely formed in the upper surfaces or the lower surfaces of the cooling cores 10 to connect the vertical grooves 11a, and thus there is an advantage that a structure of the cooling cores 10 is simple.

In addition, since directions of the connection grooves 11b of the cooling cores 10, which are provided in the space portion 4 and of which the side surfaces are in close contact with each other, intersect each other such that the flow paths 11 are sealed by the cooling cores 10 provided on the side surfaces thereof, there is an advantage that the water passing through the flow paths 11 can be effectively prevented from being leaked to the outside.

In addition, the upper mold 1 includes the upper mold body 1a, of which the lower surface is provided with the cavity 3 formed therein and the upper surface is provided with the space portion 4 concavely formed therein, and the upper cover 1b coupled to the upper surface of the upper mold body 1a to seal the space portion 4, the lower mold 2 includes the lower mold body 2a of which the upper surface is provided with the cavity 3 formed therein and the lower surface is provided with the space portion 4 concavely formed therein and the lower cover 2b coupled to the lower surface of the lower mold body 2a to seal the space portion 4, and the connection passages 5 are formed in the upper cover 1b and the lower cover 2b such that one sides of the connection passages 5 are connected to the vertical grooves 11a and the other ends thereof are formed to extend outward from the upper cover 1b and the lower cover 2b, and thus there are advantages that shapes of the flow paths 11 are simple, and machining of the flow paths 11 is easy.

In the case of the above-described embodiment, although examples of the space portions 4 and the cooling cores 10 formed in the quadrangular shapes have been described, the space portions 4 and the cooling cores 10 may be formed in polygonal shapes including triangular shapes or hexagonal shapes.

In the present embodiment, although it is illustrated that the plurality of flow paths 11 and the plurality of connection passages 5 connected to the flow paths 11 are formed in the upper mold 1 or the lower mold, only one flow path 11 and only one connection passage 5 may be formed.

In this case, only one first supply pipe 21 and only one first return pipe 22 are provided.

Figure 10:
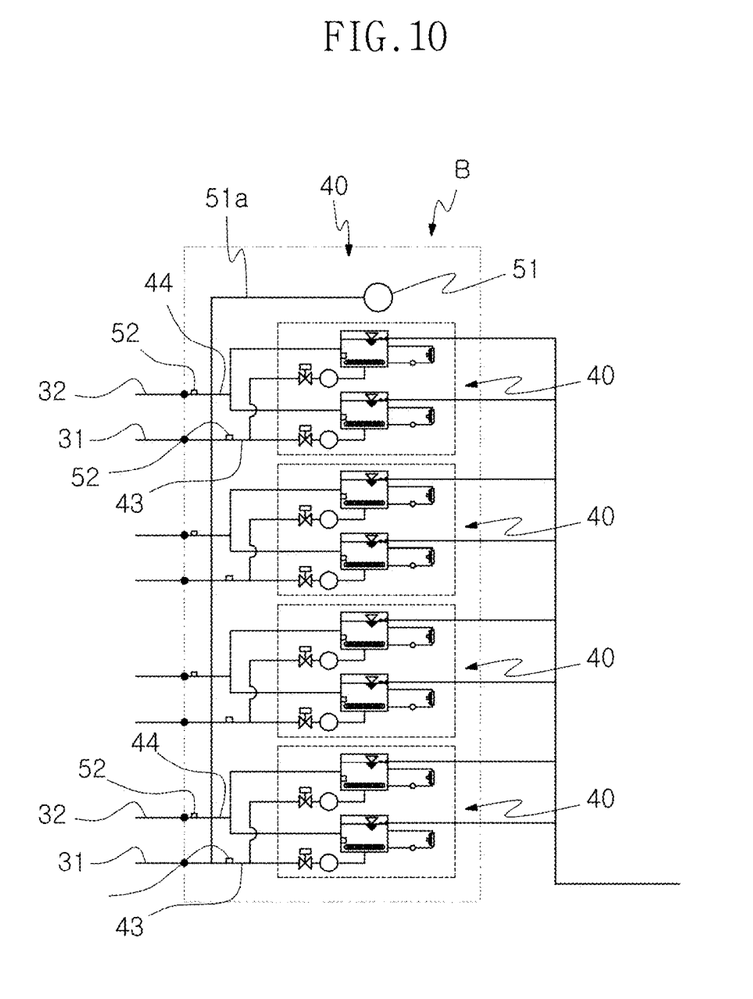
FIG. 10 is a block diagram illustrating a second example of the multi-temperature controller of the multi-control system of a mold cooling structure according to the present invention.
Figure 11:
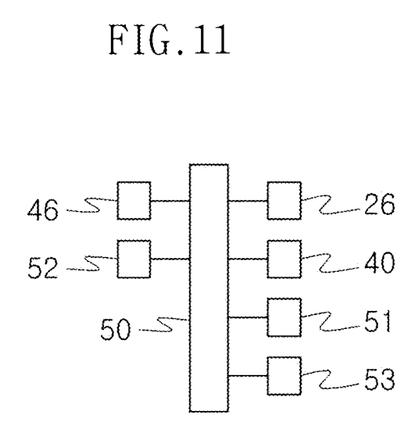
FIG. 11 is a block diagram illustrating a second example of the multi-control system of the mold cooling structure according to the present invention.

FIGS. 10 and 11 are views illustrating a second example according to the present invention, and a pressing unit 51, which is connected to the third supply pipes 43 and the third return pipes 44 of the multi-temperature controller B and supplies high pressure water to the third supply pipes 43 and the third return pipes 44, pressure sensors 52 which are provided in the third supply pipes 43 and the third return pipes 44 and measure internal pressures of the third supply pipes 43 and the third return pipes 44, and an alarm unit 53 connected to the control unit 50 are further provided.

The pressing unit 51 is connected to the third supply pipes 43 and the third return pipes 44 provided in all the temperature adjustment units 40 provided in the multi-temperature controller B through a water supply pipe 51a and formed to press the water stored in the water tanks, which are separately provided and are not illustrated, to supply the water to the third supply pipes 43 and the third return pipes 44 using pumps.

Accordingly, when the pressing unit 51 is driven, the high pressure water is supplied to the third supply pipes 43 and the third return pipes 44 to increase internal pressures of the third supply pipes 43 and the third return pipes 44 to predetermined pressures.

The pressure sensors 52 are provided in the third supply pipes 43 and the third return pipes 44 provided in all the temperature adjustment units 40 provided in the multi-temperature controller B and measure the internal pressures of the third supply pipes 43 and the third return pipe 44.

The alarm unit 53 is formed to output alarm light and an alarm sound when operating.

When the multi-temperature controller B is turned on, the control unit 50 drives the pressing unit 51 to supply the high pressure water to the third supply pipes 43 and the third return pipes 44, receives signals of the pressure sensors 52, and when pressures of the third supply pipes 43 and the third return pipes 44 do not increase to a preset reference pressure or more, a connection state of the first and second supply pipes 21 and 31 or the first and second return pipes 22 are 32 is unstable, the supplied water leaks to the outside, and the alarm unit 53 is driven to notify a worker of the state.

That is, in a state in which the cooling cores 10, the conversion distributor A, and the multi-temperature controller B are accurately connected to each other through the first and second supply pipes 21 and 31 or the first and second return pipes 22 and 32, when the high pressure water is supplied into the third supply pipes 43 and the third return pipes 44, the water does not leak to the outside, and thus the internal pressures of the third supply pipes 43 and the third return pipes 44 increase.

On the other hand, when the first and second supply pipes 21 and 31 or the first and second return pipes 22 and 32 are not accurately connected, or an abnormality occurs in the first and second supply pipes 21 and 31 or the first and second return pipes 22 and 32 due to a mistake of the worker, the water leaks to the outside when the water is supplied into the third supply pipes 43 and the third return pipes 44, and thus the internal pressures of the third supply pipes 43 and the third return pipes 44 do not increase.

Accordingly, since the fact that the pressures of the third supply pipes 43 and the third return pipes 44 do not increase to the preset reference pressure or more when the water is supplied into the third supply pipes 43 and the third return pipes 44 using the pressing unit 51 means that the multi-temperature controller B and the conversion distributor A are not accurately connected through the first and second supply pipes 21 and 31 or the first and second return pipes 22 and 32, the control unit 50 drives the alarm unit 53 to notify the worker of that fact.

In a case in which the first and second supply pipes 21 and 31 or the first and second return pipes 22 and 32 are not accurately connected to the multi-temperature controller B and the conversion distributor A, the multi-control system of a mold cooling structure formed as described above detects that and drives the alarm unit 53 to warn the worker, and thus there is an advantage of, in a state in which that first and second supply pipes 21 and 31 or the first and second return pipes 22 and 32 are not accurately connected to the multi-temperature controller B and the conversion distributor A, preventing the multi-temperature controller B from operating, the high temperature water from leaking to the outside, and thus temperatures of the upper and lower molds 1 and 2 from not being accurately adjusted.

In a multi-control system of a mold cooling structure according to the present invention, in a state in which temperatures of water stored in cold and hot water tanks 41 and 42 are adjusted to be set temperatures, when water supply pumps 45 are driven, the water stored in the cold and hot water tanks 41 and 42 is supplied to a conversion distributor A, and when opening and closing valves 26 provided in the conversion distributor A are adjusted, the water supplied to supply branch pipes 24 is supplied to first supply pipes 21 and then passes through flow paths 11 of cooling cores 10 to heat or cool the cooling cores 10 and portions of upper and lower molds 1 and 2 at temperatures different from each other, and then returned to the cold and hot water tanks 41 and 42 of temperature adjustment units 40 through first return pipes 22 and return branch pipes 25.

Accordingly, the temperatures of the cooling cores 10 and the portions of the upper and lower molds 1 and 2 can be freely adjusted.

Particularly, as necessary, the opening and closing valves 26 can be controlled even during an injection cycle to change the water supplied to the cores 10 to be high temperature or low temperature water so as to freely adjust an input time and pressure or flow rate of the water supplied to each of the cooling cores 10.

That is, when the opening and closing valves 26 are adjusted to supply the water, which is supplied to two supply branch pipes 24, to one first supply pipe 21, the pressure and the flow rate of the water supplied to the cooling core 10 through the corresponding first supply pipe 21 increase, and thus the cooling core 10 connected to the corresponding first supply pipe 21 can be more rapidly heated or cooled to more rapidly adjust the portions of the upper and lower molds 1 and 2.

Accordingly, since an injection molding product is extracted after a synthetic resin injected into the upper and lower molds 1 and 2 is sufficiently cooled, there are advantages that the injection molding product, which is not sufficiently cooled, can be prevented from being deformed while being cooled at room temperature to improve the quality of the product, and a speed of cooling the upper and lower molds 1 and 2 can be improved to reduce a time for cooling the upper and lower molds 1 and 2 to improve productivity.

What is claimed is:

1. A multi-control system of a mold cooling structure, comprising upper and lower molds of which adjacent surfaces are provided with cavities formed therein,
   wherein one or more flow paths and one or more connection passages connected to the one or more flow paths are formed in the upper mold or the lower mold,
   the multi-control system further comprises a conversion distributor connected to the one or more connection passages through one or more first supply pipes and one or more first return pipes, a multi-temperature controller connected to the conversion distributor through one or more second supply pipes and one or more second return pipes, and a control unit which controls operation of the conversion distributor and the multi-temperature controller,
   water of which temperatures are variously adjusted is supplied to the conversion distributor using the multi-temperature controller,
   the water supplied by the multi-temperature controller is supplied to flow paths different from each other using the conversion distributor,
   the conversion distributor includes a distribution case, a plurality of supply branch pipes connecting the one or more first supply pipes and the one or more second supply pipes, a plurality of return branch pipes connecting the one or more first return pipes and the one or more second return pipes, and opening and closing valves provided in the supply branch pipes and the return branch pipes, a plurality of supply branch parts connected to the one or more first supply pipes are formed in front end portions of the supply branch pipes, rear end portions of the supply branch pipes are each connected to any one of the second supply pipes, a plurality of return branch parts connected to the one or more first return pipes are formed in front end portions of the return branch pipes, rear end portions of the return branch pipes are each connected to any one of the second return pipes, the opening and closing valves are provided in the supply branch parts and the return branch parts and control flows of the water passing through the supply branch parts and the return branch parts, a space portion is formed in the upper mold or the lower mold, a plurality of cooling cores of which circumferential surfaces are provided with the flow paths formed therein are provided in the space portion, the one or more connection passages of which one ends are connected to the plurality of cooling cores and the other ends extend outward from the upper and lower molds are formed in the upper mold or the lower mold, each of the plurality of cooling cores is formed in a quadrangular block shape extending in a vertical direction; and each of the flow paths includes vertical grooves formed in both surfaces of the cooling core to extend in the vertical direction and a connection groove formed in an upper surface or a lower surface of the cooling core to connect the vertical grooves.

2. The multi-control system of claim 1, wherein directions of the connection grooves of the plurality of cooling cores, which are provided in the space portion and of which the side surfaces are in close contact with each other, intersect each other.

3. The multi-control system of claim 2, wherein:

the upper mold includes an upper mold body of which a lower surface is provided with the cavity formed therein and an upper surface is provided with the space portion concavely formed therein and an upper cover coupled to the upper surface of the upper mold body to seal the space portion;

the lower mold includes a lower mold body of which an upper surface is provided with the cavity formed therein and a lower surface is provided with the space portion concavely formed therein and a lower cover coupled to the lower surface of the lower mold body to seal the space portion; and the one or more connection passages are formed in the upper cover and the lower cover such that one sides of the one or more connection passages are connected to the vertical groove and the other ends of the one or more connection passages are formed to extend outward from the upper cover and the lower cover.

4. The multi-control system of claim 3, wherein:

the space portions are formed in quadrangular shapes in the upper mold body and lower mold body;

the cooling core is formed in the quadrangular block shape extending in the vertical direction; and one or more of the plurality of cooling cores are installed to be inserted into the space portions such that side surfaces of the plurality of cooling cores are in close contact with each other.

5. A multi-control system of a mold cooling structure, comprising upper and lower molds of which adjacent surfaces are provided with cavities formed therein, wherein one or more flow paths and one or more of connection passages connected to the one or the plurality of flow paths are formed in the upper mold or the lower mold, wherein the multi-control system further comprises a conversion distributor connected to the one or more connection passages through one or more first supply pipes and one or more first return pipes, a multi-temperature controller connected to the conversion distributor through one or more second supply pipes and second return pipes, and a control unit which controls operation of the conversion distributor and the multi-temperature controller, water of which temperatures are variously adjusted is supplied to the conversion distributor using the multi-temperature controller, the water supplied by the multi-temperature controller is supplied to flow paths different from each other using the conversion distributor, the conversion distributor includes a distribution case, a plurality of supply branch pipes connecting the one or more first supply pipes and the one or more second supply pipes, a plurality of return branch pipes connecting the one or more first return pipes and the one or more second return pipes, and opening and closing valves provided in the supply branch pipes and the return branch pipes, a plurality of supply branch parts connected to the one or more first supply pipes are formed in front end portions of the supply branch pipes, rear end portions of the supply branch pipes are each connected to any one of the second supply pipes, a plurality of return branch parts connected to the one or more first return pipes are formed in front end portions of the return branch pipes, rear end portions of the return branch pipes are each connected to any one of the second return pipes, the opening and closing valves are provided in the supply branch parts and the return branch parts and control flows of the water passing through the supply branch parts and the return branch parts, wherein the multi-temperature controller includes:

a temperature adjustment case, and a plurality of temperature adjustment units provided in the temperature adjustment case and connected to one or more second supply pipes and one or more second return pipes, wherein the one or more second supply pipes and the second return pipes are connected to the rear end portions of the supply branch pipes and the return branch pipes, the temperature adjustment units include cold and hot water tanks in which the water is stored, third supply pipes connecting the cold and hot water tanks to the one or more second supply pipes in parallel, third return pipes connecting the cold and hot water tanks to the second return pipes in parallel, water supply pumps provided in the third supply pipes, and temperature adjustment parts which are connected to the cold and hot water tanks and adjust temperatures of the water stored in the cold and hot water tanks, wherein the temperatures of the water stored in the cold water tanks provided in the temperature adjustment units range from 0 to 120° C., the temperatures of the water stored in the hot water tanks provided in the temperature adjustment units range from 0 to 180° C., wherein the multi-control system further comprises a pressing unit which is connected to the third supply pipes and the third return pipes of the multi-temperature controller and supplies high pressure water to the third supply pipes and the third return pipes;

pressure sensors which are provided in the third supply pipes and the third return pipes and measure internal pressures of the third supply pipes and the third return pipes; and an alarm unit connected to the control unit, wherein the control unit drives the pressing unit to supply the high pressure water to the third supply pipes and the third return pipes and receives signals of the pressure sensors, and when the pressures of the third supply pipes and the third return pipes do not increase to a preset reference pressure or more, the control unit determines that a connection state of the one or more first supply pipes and the one or more second supply pipes or the one or more first return pipes and the one or more second return pipes is unstable and drives the alarm unit to notify a worker of the unstable connection state.

* * * * *